United States Patent [19]
Denz et al.

[11] Patent Number: 5,245,972
[45] Date of Patent: Sep. 21, 1993

[54] SEQUENTIAL FUEL INJECTION METHOD

[75] Inventors: Helmut Denz, Stuttgart; Klemens Grieser, Ditzingen, both of Fed. Rep. of Germany

[73] Assignee: Robert Bosch GmbH, Stuttgart, Fed. Rep. of Germany

[21] Appl. No.: 820,894
[22] PCT Filed: Jun. 20, 1990
[86] PCT No.: PCT/DE90/00465
  § 371 Date: Feb. 28, 1992
  § 102(e) Date: Feb. 28, 1992
[87] PCT Pub. No.: WO91/01443
  PCT Pub. Date: Feb. 7, 1991

[30] Foreign Application Priority Data
Jul. 15, 1989 [DE] Fed. Rep. of Germany ....... 3923479

[51] Int. Cl.$^5$ .......................................... F02M 51/00
[52] U.S. Cl. ..................... 123/478; 123/501
[58] Field of Search ............ 123/478, 501, 419, 436

[56] References Cited

U.S. PATENT DOCUMENTS

| | | | |
|---|---|---|---|
| 3,935,846 | 2/1976 | Zelenka | 123/478 |
| 4,495,924 | 1/1985 | Ueno | 123/478 |
| 4,911,131 | 3/1990 | Nakaniwa | 123/478 |
| 4,987,876 | 1/1991 | Minamitani | 123/478 |
| 5,003,952 | 4/1991 | Weglarz | 123/478 |
| 5,068,794 | 11/1991 | Hosaka | 123/478 |
| 5,090,390 | 2/1992 | Feldinger | 123/478 |
| 5,095,874 | 3/1992 | Schnaibel | 123/478 |

*Primary Examiner*—Carl S. Miller
*Attorney, Agent, or Firm*—Kenyon & Kenyon

[57] ABSTRACT

A method for carrying out sequential injection processes when predetermined injection angles are reached in which crankshaft-angle increment signals are generated and these increment signals are counted in relation to a reference signal. With the aid of these increment signals, it is determined whether an injection angle set as an increment value has been reached. As soon as this is determined, the injection process assigned to this increment value is carried out, i.e., injection is begun or ended. Using this method, it is possible to set injection start angles and/or injection end angles accurately, it is possible to set the angular position of injection processes in relation to intake processes more accurately than hitherto, and it is possible, with great reliability, to avoid the occurrence of overenrichment and leaning due to an injection process being begun during a still continuing preceding intake stroke or being continued beyond a decisive intake stroke.

5 Claims, 1 Drawing Sheet

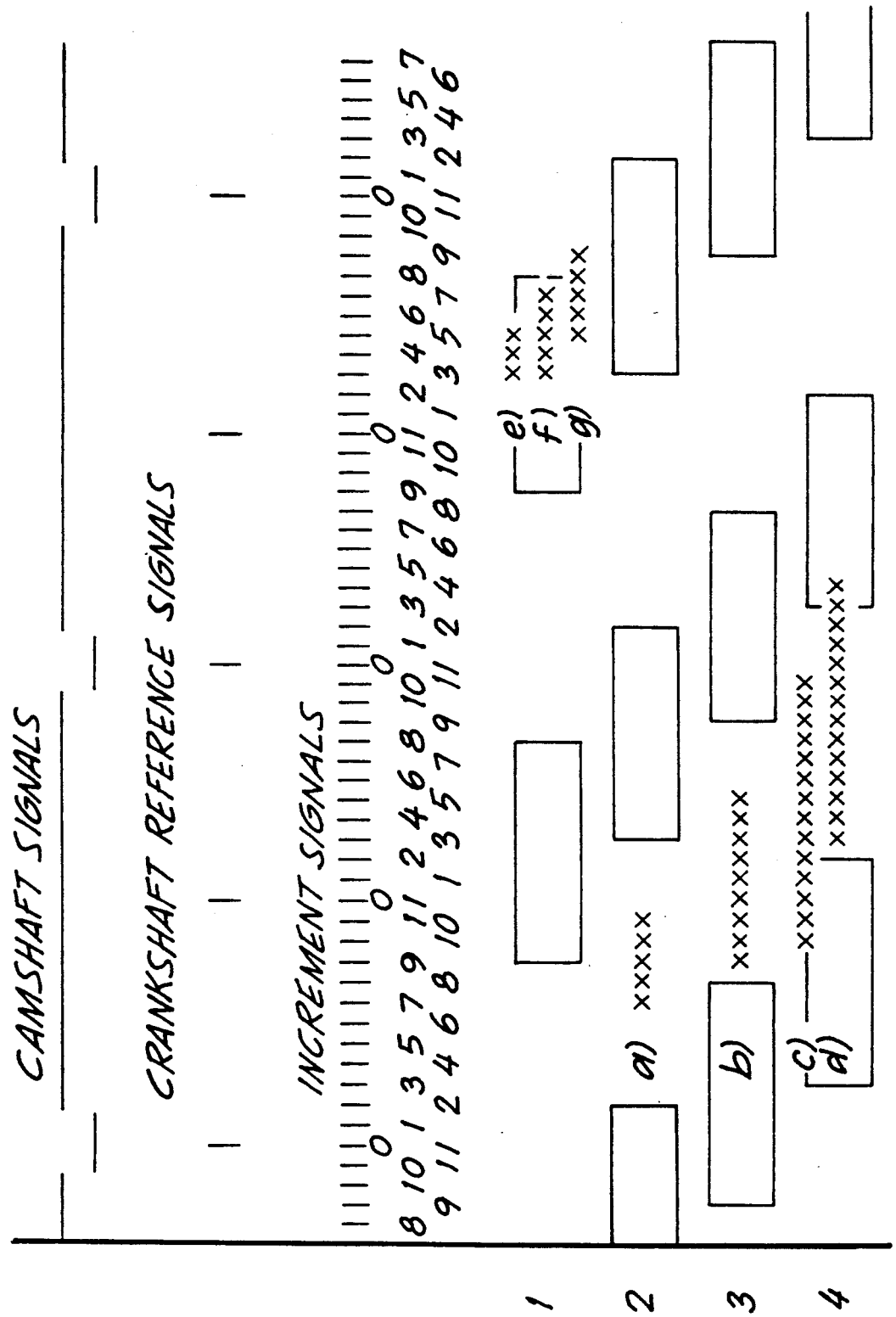

SEQUENTIAL FUEL INJECTION METHOD

FIELD OF THE INVENTION

The invention relates to a method for carrying out sequential injection processes when predetermined injection angles are reached.

BACKGROUND OF THE INVENTION

Sequential injection methods, which are referred to below as SEFI methods (SEFI=Sequential Fuel Injection), are performed on internal combustion engines in which one injection valve is allocated to one cylinder or to one group of cylinders. A computer sets the values for the beginning and end of the activation of a respective injection valve depending on the particular operating condition of the internal combustion engine. A variant employed in practice consists in setting the injection start angle and calculating the end of injection from an injection duration. Another variant adopts the method of setting the injection end angle and calculating the injection start angle from a respective injection end angle and an associated injection duration.

A problem in both variants is the fact that it is not possible to exactly achieve the calculated angles for the start of injection and the end of injection. This is because in known SEFI methods for a 4 cylinder engine, a so-called segment signal is only emitted every 180° of crankshaft angle. If an injection angle, whether a start angle or an end angle, is set at, for example, 552° crankshaft angle, three segment marks are counted out after the beginning of the current work cycle, a crankshaft angle of 540° thereby is reached. The missing 12° are determined by counting out time pulses.

The number of time pulses which occurs within an angular range of 12° crankshaft angle depends on the speed of the internal combustion engine. If there is a relatively rapid change in speed during the period of time between the calculation of the number of time pulses to be counted out and the instant at which the counting out of the pulses is actually started, the injection angle which is actually desired is missed by a considerable amount. Rapid speed changes within this period of time occur particularly in the starting period and in other cases in which the internal combustion engine initially has only a low speed, which is then increased a great extent.

The object on which the present invention is based is to provide a SEFI method which permits more exact achievement of predetermined injection angles than was hitherto possible.

SUMMARY OF THE INVENTION

In the method according to the invention, crankshaft-angle increment signals are generated and these are counted in relation to a reference signal. As soon as the count value of the increment signals reaches a set injection-angle increment value, the injection process assigned to this increment value is carried out; that is to say, a valve begins or ends the injection of fuel.

By virtue of the fact that no time measurement of any kind is now used to determine whether a predetermined injection angle has been reached, the method cannot be influenced by speed fluctuations with regard to the determination of the set angles.

If, for each injection process, the associated injection start angle is set, this angle can be achieved with the accuracy of the increment pitch, e.g., an accuracy of 6° crankshaft angle, regardless of how large the speed fluctuations that are experienced. However, the angular position of the end of injection is then not exactly fixed since it is of primary importance that a predetermined injection duration should be complied with. With the method according to the invention, however, it is possible to limit the end of injection to a maximum crank angle, e.g. to the angle at which the inlet valve for the cylinder for which injection is being performed at that precise moment it closes. In conventional segment SEFI methods, this was not possible, since it was impossible to determine accurately the instant of the closing of this valve in the case of speed changes.

It is advantageous in practice if the end of injection occurs at a certain angle before the angle for opening the inlet valve. From this angle and the injection duration it is possible to set the injection start angle. According to an advantageous further embodiment of the present invention, injection start angles determined in this way are read out from a characteristic map which can be addressed via values of speed and injection duration. In each case, however, the injection start angles are stored in a characteristic map with such values or calculated in such a way that there is no risk of starting an injection process for a subsequent intake process before the current intake process has been completed. This avoids over enrichment in the current intake process. Such overenrichment cannot be ruled out when the conventional segment SEFI method is used, since the angular position of the crank for closing the inlet valve be estimated only on the basis of a time pulse count, which is incorrect to a greater or lesser extent in the case of speed changes.

The method according to the present invention thus has the advantage that it is possible to begin and/or end injection with great accuracy at predetermined crankshaft angles It is thereby possible to prevent instances of overenrichment and/or excessive leaning with great reliability. It can furthermore be ensured that unwanted injection states do not occur, that, for example, fuel is not injected into the open injection valve in cases where this would be disadvantageous.

A significant advantage of the method according to the present invention is the simplicity with which it can be implemented. This simplicity of implementation is due to the fact that internal combustion engines with crankangle increment transmitters have been on the market for several years. However, the increment signals have hitherto been used only for initiating ignition but not also for initiating injection processes. To the contrary, the increment signals were used to calculate segment signals which, together with a time determination. were used to estimate when a predetermined injection angle had been reached. The method according to the present invention makes direct use of these increment signals which are present.

BRIEF DESCRIPTION OF THE DRAWING

The FIGURE shows the seven examples of method sequences.

DETAILED DESCRIPTION OF THE PRESENT INVENTION

The illustrative embodiments herein relate to a four-cylinder four-stroke engine. In such an engine, as in any four-stroke engine, a single work cycle extends over 720° of crankshaft angle, i.e., over two crankshaft revolutions. In this time, the camshaft rotates once. A camshaft sensor emits a camshaft signal for each revolution of the camshaft, i.e., one every 720° of crankshaft angle. A crankshaft sensor furthermore makes available crankshaft reference signals every 360°. The beginning of a work cycle occurs whenever a camshaft signal and a crankshaft reference signal occur together. If, on the other hand, a crankshaft reference signal occurs without a simultaneous camshaft signal, the half-way stage of a work cycle has been reached.

Increment signals are supplied by a third sensor, which scans a transmitter wheel rotating synchronously with the crankshaft. In the FIGURE, it has been assumed for the sake of clarity that increment signals are emitted, in each case, between two neighboring crankshaft reference signals 12, i.e. one every 30° crankshaft angle. In practice, however, the resolution of the increment signals is higher, at present, typically being 6° crankshaft angle in increment systems. In the FIGURE, it has been assumed that the increment signals are counted from "0" again whenever a crankshaft reference signal occurs. Accordingly, crank angle 540° is detected by ascertaining that the last crankshaft reference signal was that with which no camshaft signal occurred, and that since then, six increment signals have occurred. Instead, it would also be possible to begin counting again at each camshaft signal. The crankshaft angle of 540° would then correspond to increment signal '18''. Other combinations of the occurring signals are also possible in order to determine the respectively current crankshaft angle.

In the abovementioned illustrative embodiment, a so-called two-transmitter increment system has been described to simplify the illustration, the said system requiring one transmitter each for the production of the increment signals and the crankshaft reference signals. However, the same method can be employed with the single-transmitter increment system, which is now more common and in which a single sensor is used to scan a transmitter wheel on the crankshaft, and the teeth of the wheel has one gap per revolution, which is evaluated as crankshaft reference signal.

In the FIGURE, rectangles are used to plot the crank angle periods over which the inlet valve arrangements of cylinders 1-4 are open. The cylinder numbers are entered one below the other at the left-hand edge. "xx..x" is used to indicate various angular ranges of injection processes. There are a total of seven different Cases a) to g).

Cases a) to c) refer to operating states for which it is desired that the respective injection end angle should lie at a fixed distance before the opening of the inlet. For all three cases, it is assumed that the injection duration, that is to say the period of time over which the injection process extends, is of equal length. However, the speed increases from a), via b), to c). This means that the angular extent of injection becomes increasingly large. Accordingly, the beginning of injection in Case b) is closer behind the closing of the inlet in the previous intake stroke than the beginning of injection in Case a). If the abovementioned desired end of injection were to be retained, then injection in the case of Example c) would be begun before the end of the intake period of the current intake stroke in order to allow completion at the desired end. In the preferred illustrative embodiment, however, the procedure is such that an injection start angle never occurs during a current intake stroke. Accordingly, the beginning of injection in Case d) lies directly after the closing of the inlet in the previous stroke. The injection durations in Cases c) and d) are the same. The shifting of the beginning of injection then leads to the impossibility of retaining the desired end of injection. In the case of the very long injection duration illustrated, the end of injection occurs during the intake stroke with the result that fuel is injected into the open inlet valve. However, this leads to less serious disturbances of operation than those which occur if, as in Case c), overenrichment in the current intake stroke and leaning in the subsequent intake stroke occur.

There are various possibilities for setting injection angles such as those used in the sequences according to Variants a)-d). Since, as explained, certain injection end angles are desired, the obvious possibility is to store injection end angles in a characteristic map in a manner addressable via values of operating parameters, preferably speed and load. As a function of the current values of the addressing parameters, the respectively associated injection end angle is read out from the characteristic map. The associated injection start angle is calculated with the aid of the current speed and the injection duration, which is determined in some other way. However less computation is involved if the injection start angle is read out directly from a characteristic map as a function of values of addressing parameters. It is particularly advantageous here to use the speed and the respectively calculated injection duration as addressing parameters. The characteristic map preferably stores different injection start angles for starting operation than for normal operation, the values of the remaining addressing parameters in each case otherwise remaining the same, that is to say, for example, those of speed and injection duration. The end of starting operation can be set as desired, in particular by the condition that a certain speed is reached. It is also advantageous to allow for a anticipation angle in the injection angles read out from a characteristic map, with the result that, even if acceleration occurs, a certain latest injection end angle is never exceeded. In all cases, however, it is a very particular advantage that it is possible to ensure that no injection start angle lies before the closing of the inlet of a current intake stroke.

The condition mentioned in the previous sentence can be refined somewhat if the flight of the fuel from an injection valve to the associated inlet valve is allowed for. It is namely possible to begin a new injection process by an amount of time corresponding to this flight time before the closing of the inlet of the current stroke.

In illustrative Case e), the entire quantity of fuel is injected into the open injection valve for the cylinder 1. This is advantageous, for example, when, in the case of a lean mixture, charge stratification is to be achieved, such that there is a relatively rich mixture in the upper part of the cylinder, i.e., close to the spark plug. In this case too, it is particularly advantageous to read out the injection start angle directly by addressing a memory with current values of speed and injection duration.

In Example f), it is assumed that the injection duration is the same as that in Case e) but that the speed is higher. The injection process then extends over a larger crankshaft angle range than in Case e). It is, however, assumed that the end of injection still lies before the closing of the inlet value of the actual intake stroke. If this were not the case, the injection process would preferably be ended with the closing of the inlet, even if not all the quantity of fuel actually desired had been ejected. This prevents the residual quantity from leading to overenrichment during the next intake stroke. The residual quantity is in any case without significance for the current intake stroke since it can no longer be drawn in, with the result that it has no influence on the current intake stroke even if it is not ejected at all. The above-mentioned fuel flight time can again be allowed for even in the case of this enforced discontinuation of an injection process. The injection process is then ended by the said flight time before the closing of the inlet value.

Example g) shows a variant which corresponds to Variant f), not, however, for the increment SEFI method explained thus far but for a conventional segment SEFI method. It should be assumed that the last crankshaft reference signal before the decisive start of injection corresponds to a segment signal such as that used in a segment SEFI method. In a segment SEFI method, segment signals are in fact not only emitted every 360° of crankshaft angle, as is the case with the crankshaft reference signals plotted in the FIGURE, but every 180°. However, this is of no significance for the explanation of the differences between Variants f) and g). In the case of a segment SEFI method, time counting would be begun from the last segment signal in order to determine the start of injection. If the speed increases in the period of time following the calculation of the clock pulses to be counted out, this leads, in the segment SEFI method, not only to an increase in the angular extent of the injection duration, as explained with reference to Examples e) and f), but, in addition, to a shift in the start of injection, as can be seen from Example g). This shift in the start of injection leads to the end of injection extending beyond the closing of the inlet of the relevant intake stroke. This exceeding of the closing of the inlet value cannot be detected since it lies between two segment signals, that is to say in a range in which, if the speed changes, angular positions can only be roughly estimated by counting out clock pulses.

We claim:

1. A method for carrying out sequential injection processes in injection systems for internal combustion engines, comprising the steps of:
   A) generating crankshaft angle increment signals in relation to a reference signal;
   B) counting the crankshaft angle increment signals;
   C) setting injection start angles in accordance with predetermined crankshaft angle increment signal count values;
   D) determining an injection duration for cylinders of an internal combustion engine based on operating parameters of the engine; and
   E) discontinuing injection to a cylinder before an end of an injection duration for that cylinder is reached at a crankshaft angle that corresponds to a flight time of fuel from an injection value to an associated inlet valve for that cylinder before the closing crankshaft angle of the inlet valve.

2. The method as recited in claim 1, wherein an earliest injection start angle for an injection valve is at a crankshaft angle before the crankshaft angle at which the inlet valve closes which corresponds to the flight time of fuel from the injection valve to its associated inlet valve.

3. The method as recited in claim 1 wherein the method further comprises the step of reading injection start angles from a characteristic map, which stores therein different injection start angles for starting operations and post-starting operations, based on the speed of an internal combustion engine and the injection duration for a specific cylinder.

4. The method as recited in claim 1, wherein special injection start angles are generated for dynamic operating starts.

5. The method as recited in claim 4, wherein the method further comprises the step of reading injection end angles from a characteristic map based on a load and the speed of the internal combustion engine.

* * * * *

UNITED STATES PATENT AND TRADEMARK OFFICE
CERTIFICATE OF CORRECTION

PATENT NO. : 5,245,972

DATED : September 21, 1993

INVENTOR(S) : Denz et al.

It is certified that error appears in the above-indentified patent and that said Letters Patent is hereby corrected as shown below:

Column 2      line 38, change "angles" to --angles.--;

Column 6      line 32, change "1" to --3--.

Signed and Sealed this

Twenty-fourth Day of May, 1994

Attest:

BRUCE LEHMAN

*Attesting Officer*      *Commissioner of Patents and Trademarks*